(12) United States Patent
Sato

(10) Patent No.: US 12,303,986 B2
(45) Date of Patent: May 20, 2025

(54) ROTATING TOOL WITH COOLANT HOLE

(71) Applicant: MITSUBISHI MATERIALS CORPORATION, Tokyo (JP)

(72) Inventor: Akira Sato, Tokyo (JP)

(73) Assignee: MITSUBISHI MATERIALS CORPORATION, Tokyo (JP)

(*) Notice: Subject to any disclaimer, the term of this patent is extended or adjusted under 35 U.S.C. 154(b) by 654 days.

(21) Appl. No.: 17/417,522

(22) PCT Filed: Dec. 23, 2019

(86) PCT No.: PCT/JP2019/050266
§ 371 (c)(1),
(2) Date: Jun. 23, 2021

(87) PCT Pub. No.: WO2020/137937
PCT Pub. Date: Jul. 2, 2020

(65) Prior Publication Data
US 2022/0111450 A1     Apr. 14, 2022

(30) Foreign Application Priority Data

Dec. 26, 2018 (JP) .................................. 2018-242586
Oct. 31, 2019 (JP) .................................. 2019-198973

(51) Int. Cl.
*B23B 51/06* (2006.01)
*B23C 5/28* (2006.01)

(52) U.S. Cl.
CPC ........ *B23B 51/068* (2022.01); *B23B 51/0686* (2022.01); *B23C 5/282* (2022.02)

(58) Field of Classification Search
CPC ... B23B 51/0686; B23B 51/068; B23B 51/06; B23C 5/282; B23C 5/28
See application file for complete search history.

(56) References Cited

U.S. PATENT DOCUMENTS

| | | | |
|---|---|---|---|
| 4,826,364 A | 5/1989 | Grunsky | |
| 2005/0244235 A1* | 11/2005 | Kleiner | B23B 51/06 408/59 |

(Continued)

FOREIGN PATENT DOCUMENTS

| | | |
|---|---|---|
| CN | 201253702 Y | 6/2009 |
| CN | 101970158 A | 2/2011 |

(Continued)

OTHER PUBLICATIONS

International Search Report mailed Mar. 10, 2020, issued for PCT/JP2019/050266 and English translation thereof.

(Continued)

*Primary Examiner* — Alan Snyder
(74) *Attorney, Agent, or Firm* — Troutman Pepper Locke LLP

(57) ABSTRACT

In a rotating tool with a coolant hole, a coolant hole extending to a front side in the direction of an axis opening to a tip flank face of a drill main body that is rotated around the axis. In a cross section orthogonal to the axis, the coolant hole is provided with a first concavely curved portion located on an inner peripheral side of the drill main body and formed in a concavely curved shape recessed to the inner peripheral side, a second concavely curved portion located on an outer peripheral side of the drill main body and formed in a concavely curved shape recessed to the outer peripheral side with a larger curvature radius than the first concavely curved portion, two third concavely curved portions having a center of a curvature radius located inside the coolant hole with a smaller curvature radius than the second concavely curved portion.

7 Claims, 8 Drawing Sheets

(56) References Cited

U.S. PATENT DOCUMENTS

| | | | |
|---|---|---|---|
| 2006/0006576 A1 | 1/2006 | Karos | |
| 2012/0082524 A1* | 4/2012 | Matsuda | B23B 51/06 408/59 |
| 2015/0030396 A1 | 1/2015 | Abe et al. | |
| 2015/0321267 A1 | 11/2015 | Takai | |
| 2016/0031016 A1* | 2/2016 | Takai | B23B 51/02 408/57 |
| 2016/0059323 A1* | 3/2016 | Riester | B23B 51/06 408/57 |
| 2017/0291229 A1 | 10/2017 | Genini et al. | |
| 2018/0236568 A1 | 8/2018 | Yamamoto et al. | |
| 2019/0143423 A1* | 5/2019 | Nakata | B23C 5/28 408/226 |

FOREIGN PATENT DOCUMENTS

| | | |
|---|---|---|
| CN | 202278228 U | 6/2012 |
| CN | 205129020 U | 4/2016 |
| EP | 2444185 A1 | 4/2012 |
| JP | 2006-510494 A | 3/2006 |
| JP | 2006-510804 A | 3/2006 |
| JP | 2011-020255 A | 2/2011 |
| JP | 2011-121173 A | 6/2011 |
| JP | 2013-166232 A | 8/2013 |
| JP | 5447129 B2 | 3/2014 |
| JP | 2016-514625 A | 5/2016 |
| JP | 5926877 B2 | 5/2016 |
| JP | 2017-205844 A | 11/2017 |
| WO | 14/118881 A1 | 8/2014 |

OTHER PUBLICATIONS

Supplementary European Search Report dated Aug. 17, 2022, issued for European Patent Application No. 19905782.9.

Office Action mailed Aug. 28, 2023, issued for CN201980085869.1 and English translation of the Search Report.

Notice of Allowance mailed Feb. 27, 2024, issued for JP2019-198973 and English translation thereof.

Notice of Allowance mailed Jul. 16, 2024, issued for CN201980085869.1 and English translation thereof.

* cited by examiner

ROTATING TOOL WITH COOLANT HOLE

TECHNICAL FIELD

The present invention relates to a rotating tool with a coolant hole in which a coolant hole opening to at least one of a tip flank face of the rotating tool main body and an inner wall face of a chip discharge flute is formed inside a rotating tool main body of a rotating tool such as a drill, a reamer, or an end mill.

Priorities are claimed on Japanese Patent Application No. 2018-242586, filed on Dec. 26, 2018 and Japanese Patent Application No. 2019-198973, filed on Oct. 31, 2019, the contents of which are incorporated herein by reference.

BACKGROUND ART

As such a rotating tool with a coolant hole, for example, Patent Document 1 describes a drill with a coolant hole in which a coolant hole opening to a tip flank face of a cutting edge portion is drilled in a cutting edge portion formed on a front side of a drill main body configured to be rotated around an axis. In a cross section orthogonal to an axis, the coolant hole of the drill described in Patent Document 1 includes a forward hole wall surface located on a forward side in a drill rotation direction, a backward hole wall surface located on a backward side in the drill rotation direction, and an outer peripheral hole wall surface located on an outer peripheral side of the drill main body. Also, the forward hole wall surface and the backward hole wall surface among these wall surfaces are formed such that a circumferential gap therebetween gradually increases toward the outer peripheral side and a proportion, in which the gap increases, gradually increases toward the outer peripheral side.

Additionally, similarly, as the drill with a coolant hole, Patent Document 2 describes a drill with a cutting fluid supply hole including a tool main body having a cutting edge provided at an axial tip, a groove portion having a discharge flute for discharging chips generated from the cutting edge formed on a front side of the tool main body, and a cutting fluid supply hole for supplying a cutting fluid to a cutting edge side through the groove portion. The cutting fluid supply hole of the drill described in Patent Document 2 has a fan-shaped cross-section surrounded by a forward-side inner wall face located in a radial direction on a forward side in a rotation direction of the drill, a backward-side inner wall face located in the radial direction on a backward side in the rotation direction of the drill to face the forward-side inner wall face in a circumferential direction, an outer peripheral side inner wall face centered on a center line of the drill and consisting of partially cylindrical surface, and an inner peripheral side inner wall face centered on the center line of the drill, consisting of a partially cylindrical surface having a smaller curvature radius than the outer peripheral side inner wall face, and facing the outer peripheral side inner wall face in the radial direction.

CITATION LIST

Patent Documents

[Patent Document 1]
 Japanese Patent No. 5447129
[Patent Document 2]
 Japanese Patent No. 5926877

SUMMARY OF INVENTION

Technical Problem

However, the coolant drill with a coolant hole described in Patent Document 1 is formed such that the proportion in which the circumferential gap between the forward hole wall surface and the backward hole wall surface gradually increases toward the outer peripheral side. The forward hole wall surface and the backward hole wall surface form a convex curve that is convex to the inside of the coolant hole in the cross section orthogonal to the axis of the drill main body. For this reason, it is not possible to secure a large cross-sectional area of the coolant hole, and particularly in a drill having a small cutting edge diameter, there is a concern that the pressure loss of the coolant may increase and a sufficient coolant discharge flow rate may not be obtained.

Additionally, also in the coolant hole drill described in Patent Document 2, the inner peripheral side inner wall face is the partially cylindrical surface centered on the center line of the drill, and a convex curve is formed that is convex to the inside of the coolant hole toward the outer peripheral side inner wall face facing in the radial direction in the cross section orthogonal to the axis of the drill main body. For this reason, there is a concern that a large cross-sectional area of the coolant hole cannot be secured and the coolant discharge flow rate may be insufficient. Moreover, since the inner peripheral side inner wall face has the convex curve that is convex toward the inside of the coolant hole (the outer peripheral side of the drill main body), sufficient coolant cannot be supplied to the inner peripheral side of the drill main body. Therefore, in the drills with a coolant hole described in Patent Documents 1 and 2, there is a concern that the chip discharge performance is impaired and chip clogging occurs or cooling or lubrication of the cutting edge is insufficient and damage is likely to occur.

Moreover, in the coolant drill with a coolant hole described in Patent Document 1, a corner portion where the outer peripheral hole wall surface, the forward hole wall surface, and the backward hole wall surface intersect each other is formed in a concavely curved shape in the cross section orthogonal to the axis of the drill main body. However, since the forward hole wall surface and the backward hole wall surface have the convex curve shape as described above, the curvature radius of the concave curve at this corner portion cannot be increased, and stress is concentrated and a crack is likely to be generated at the stage of material molding. This also applies to corner portions at both ends of the inner peripheral side inner wall face of the drill with a coolant hole described in Patent Document 2 in which the cross section of the inner peripheral side inner wall face has the convex curve shape.

The present invention has been made under such a background, and an object thereof is to provide a rotating tool with a coolant hole such as a drill with a coolant hole, which can prevent the generation of a crack due to stress concentration at a corner portion of a coolant hole, can increase the cross-sectional area of the coolant hole to secure a sufficient coolant discharge flow rate, can obtain excellent chip discharge performance, and can extend the life of the rotating tool main body.

Solution to Problem

According to an aspect of the present invention, there is provided a rotating tool with a coolant hole including a rotating tool main body configured to be rotated in a tool rotation direction around an axis, a chip discharge flute that opens to a front end surface of the rotating tool main body and extends to a rear side is formed at an outer periphery of a front portion of the rotating tool main body, a cutting edge, in which a wall surface of an inner wall face of the chip discharge flute facing the tool rotation direction is used as a rake face and the front end surface of the rotating tool main body connected to the rake face is used as a tip flank face, is formed at a front side ridge portion of the wall surface, and a coolant hole that extends toward a front side in an axis direction in the rotating tool main body opens to at least one of the tip flank face and the inner wall face of the chip discharge flute. Also, there is provided a rotating tool main body in which, in a cross section orthogonal to the axis, the coolant hole is provided with a first concavely curved portion located on an inner peripheral side of the rotating tool main body and formed in a concavely curved shape recessed to the inner peripheral side, a second concavely curved portion located on an outer peripheral side of the rotating tool main body so as to face the first concavely curved portion and formed in a concavely curved shape recessed to the outer peripheral side with a larger curvature radius than a curvature radius of the first concavely curved portion, two third concavely curved portions being in contact with two end portions of the second concavely curved portion, respectively, having a center of a curvature radius located inside the coolant hole with a smaller curvature radius than that of the second concavely curved portion, extending to a center side of the rotating tool main body, and being recessed in a circumferential direction, and two linear portions connecting an end portion of the first concavely curved portion to the end portion of the third concavely curved portion that is not in contact with the second concavely curved portion.

In the rotating tool with a coolant hole configured in this way, the convexly curved portion, which is convex to the inside of the coolant hole as in the forward hole wall surface and the backward hole wall surface of the drill with a coolant hole described in Patent Document 1 and as the inner peripheral side inner wall face of the drill with a coolant hole described in Patent Document 2, is not formed in the cross section orthogonal to the axis of the rotating tool main body. For this reason, in the above cross section, the diameter of the circle inscribed on the coolant hole can be increased to secure the cross-sectional area.

Moreover, the first concavely curved portion can be located on the inner peripheral side of the rotating tool main body by the linear portion, and the coolant can also be sufficiently supplied to the inner peripheral side. Therefore, for example, even in a rotating tool with a coolant hole with a smaller cutting edge diameter, the pressure loss of the coolant can be suppressed, chip clogging can be prevented due to smooth discharge of chips by discharging the coolant at a sufficient discharge flow rate, and the life of the rotating tool main body can be extended by effective cooling and lubricating the cutting edge.

Additionally, as described above, the convexly curved portion that is convex to the inside in the cross section of the coolant hole is not formed. Therefore, unlike a case where a convexly curved portion is formed at a corner portion of such a convexly curved portion, the curvature radius of the concavely curved portion does not become smaller. That is, large curvature radii of the first concavely curved portion and the third concavely curved portion can be secured. For this reason, stress concentration can be prevented from occurring even in the first and third concavely curved portions having a smaller curvature radius than the second concavely curved portion, and a situation in which a crack is generated from the first and third concavely curved portions at the stage of material molding or the like can be prevented.

Here, it is desirable that the curvature radius of the first concavely curved portion and the curvature radius of the two third concavely curved portions are not extremely different from each other. In the coolant hole having a constant cross-sectional area, when the curvature radius of any one or two concavely curved portions among the curvature radius of the first concavely curved portion and the curvature radius of the two third concavely curved portions are extremely larger than the curvature radius of the other concavely curved portion, the curvature radius of the other concavely curved portion should be extremely reduced. For this reason, there is a concern that the generation of a crack in the other concavely curved portion cannot be reliably prevented. Therefore, it is most desirable that the curvature radius r1 of the first concavely curved portion and the curvature radius r3 of the two third concavely curved portions are equal to each other. However, it is desirable that r1/r3 is in a range of 0.5 to 2.0 because an extreme size is not caused.

Additionally, it is desirable that the first concavely curved portion is in contact with a circle having a radius of 0.05×D or more with respect to a diameter D of the cutting edge about the axis in the cross section orthogonal to the axis. When the first concavely curved portion is formed to the inner peripheral side of the rotating tool main body with respect to the circle having a radius of 0.05×D or more with respect to the diameter D of the cutting edge about the axis, there is concern that damage occurs in the rotating tool main body in a case the spacing between the coolant hole and the axis of the rotating tool main body becomes too small and an excessive load acts. In addition, in order to more reliably prevent such damage to such a rotating tool main body, it is more desirable that the first concavely curved portion is in contact with a circle having a radius of 0.15×D or more with respect to a diameter of the cutting edge about the axis in the cross section orthogonal to the axis.

Moreover, it is desirable that a curvature radius of the second concavely curved portion is 0.42×D or less with respect to a diameter of the cutting edge in the cross section orthogonal to the axis. When the curvature radius r2 of the second concavely curved portion exceeds 0.42×D, there is a concern that at least one of the two third concavely curved portions in contact with both ends of the second concavely curved portion may be located on the outer peripheral side of the rotating tool main body, and the wall thickness between two third concavely curved portion and the outer peripheral surface of the rotating tool main body may decrease, which results in damage.

In addition, the two linear portions in the present invention may be a straight line that connects the end portion of the first concavely curved portion and the end portion of the third concavely curved portion that is not in contact with the second concavely curved portion. Additionally, the linear portions may be linear portions having a substantially linear shape, such as concave curves bulging with respect to the two linear portions, which are straight lines, and having a large curvature radius unless the linear portions are convex curves that are convex to the inside of the coolant hole in the cross section orthogonal to the axis of the drill main body, unlike the forward hole wall surface and the backward hole wall surface of the drill with a coolant hole described in Patent Document 1.

However, when a maximum protruding amount (bulging amount) by which the substantially linear portions that are concave curves in this way bulge with respect to the linear portions that are straight lines, there is a concern that the spacing (wall thickness) between the wall surface of the inner wall face of the chip discharge flute facing the tool rotation direction or the wall surface of the inner wall face facing the side opposite to the tool rotation direction becomes smaller and damage occurs in the tool main body. For this reason, the maximum protruding amount is in a range of 5% or less of the diameter of the circle (the circle in contact with the second concavely curved portion and the two linear portions that are straight lines) inscribed on the coolant hole in a case where the two linear portions are straight lines.

Advantageous Effects of Invention

As described above, according to the present invention, the generation of a crack from the coolant hole at the stage of the material molding or the like can be prevented, a sufficient discharge flow rate of the coolant can be secured, chip clogging can be prevented by improving chip discharge performance, and the life of the tool can be extended by effectively cooling and lubricating the cutting edge.

DESCRIPTION OF EMBODIMENTS

Figure 1:
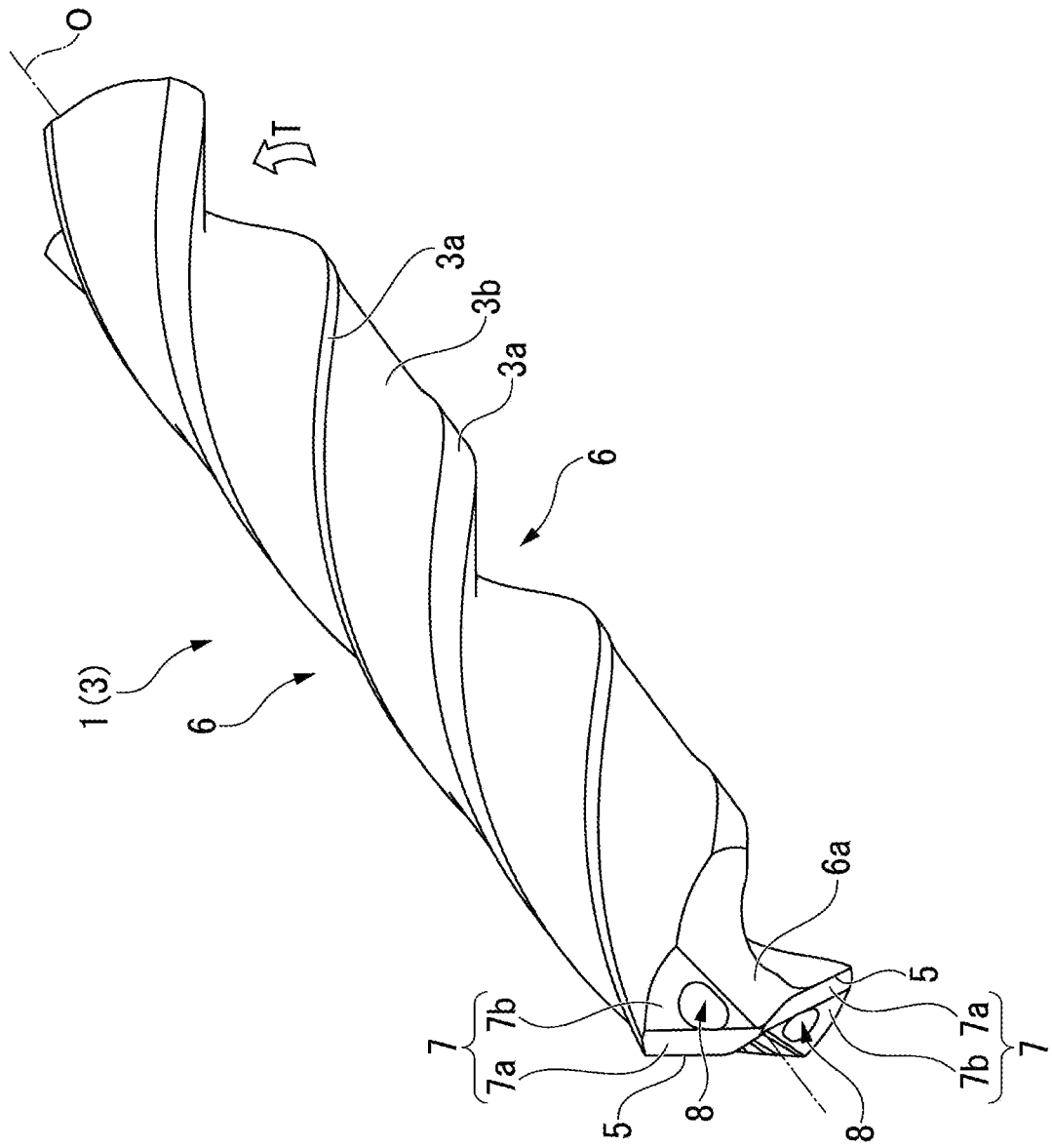
FIG. 1 is a perspective view of a front portion of a drill main body serving as a rotating tool main body showing an embodiment of a rotating tool with a coolant hole of the present invention.
Figure 2:
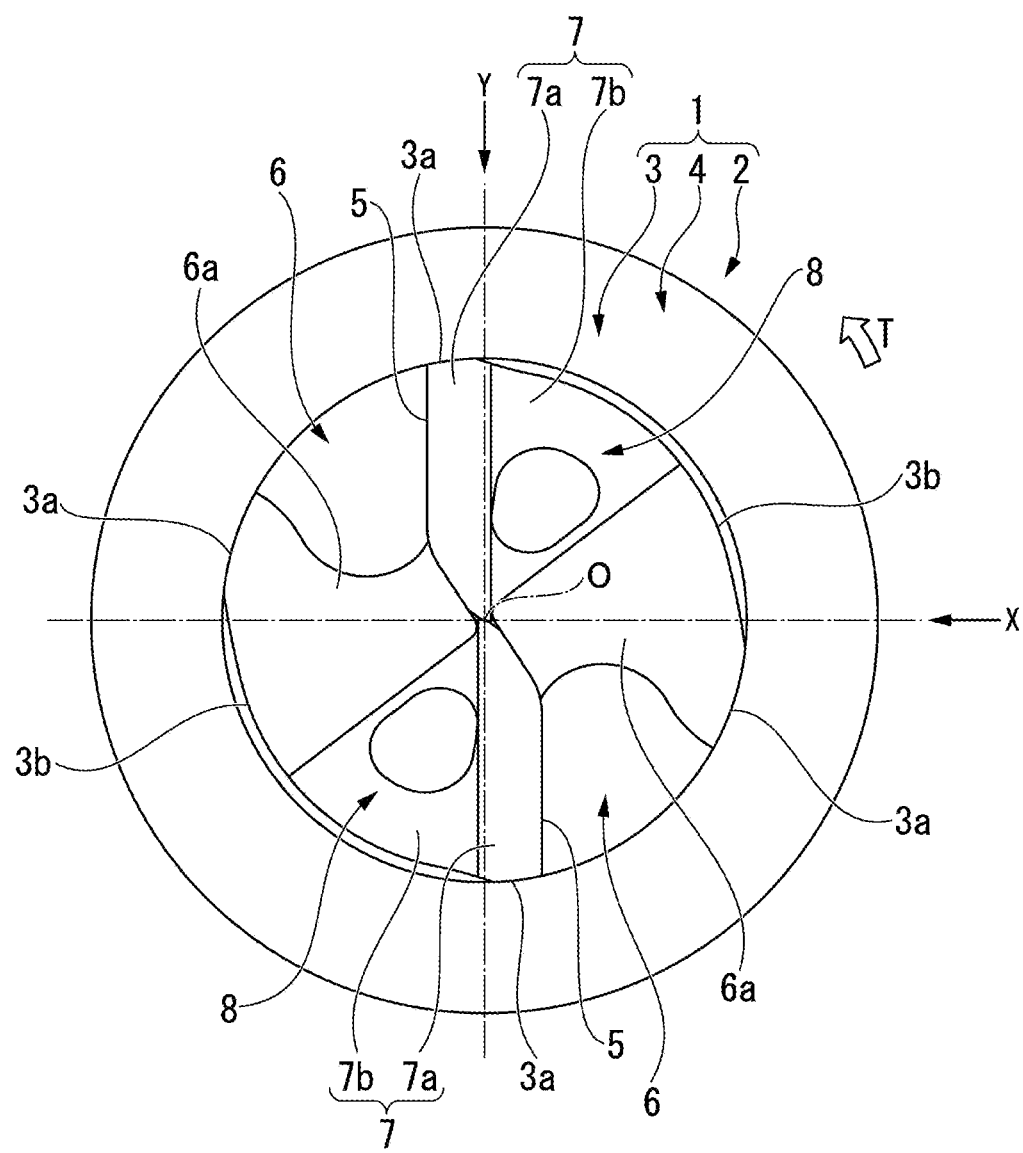
FIG. 2 is an enlarged front view of a front end surface of the drill main body shown in FIG. 1.

FIGS. 1 to 7 show an embodiment in a case where a rotating tool with a coolant hole of the present invention is applied to a drill with a coolant hole. In the present embodiment, a drill main body (rotating tool main body) 1 is integrally formed of a hard material such as cemented carbide in a substantially columnar shape having a multistage outer shape centered on an axis O. In the drill main body 1, a rear portion (a right portion in FIGS. 3 and 4) having a larger outer diameter is used as a shank portion 2 having a columnar outer shape, and a front portion (a left portion in FIG. 3 and FIG. 4) formed to have one step smaller diameter than the shank portion 2 is used as a cutting edge portion 3.

In such a drill with a coolant hole, as the shank portion 2 is fed to a front side in the direction of the axis O while being gripped by a main spindle of a machine tool and rotated in a drill rotation direction (tool rotation direction) T around the axis O, drilling is performed on a workpiece by a cutting edge 5 formed on the cutting edge portion 3. In addition, in the present embodiment, a portion between the shank portion 2 and the cutting edge portion 3 of the drill main body 1 is used as a tapered neck portion 4 having an outer diameter gradually reduced in diameter in a constant proportion toward the front side of the drill main body 1 and having a truncated cone shape centered on the axis O.

Two chip discharge flutes 6, which open to a front end surface of the drill main body 1 and extend to be twisted to a side opposite to a drill rotation direction T toward a rear side are formed symmetrically with respect to the axis O at an outer periphery of the cutting edge portion 3 of the front portion of the drill main body 1. The cutting edge 5 is formed at a front side ridge portion of a wall surface of an inner wall face of each of the chip discharge flutes 6, which face the drill rotation direction T. Therefore, a front portion of the wall surface of each chip discharge flute 6 facing the drill rotation direction T is used as a rake face of the cutting edge 5, and the front end surface of the drill main body 1 connected to the rake face is used as a tip flank face 7 of the cutting edge 5. In addition, the drill main body 1 is 180° rotationally symmetrical with respect to the axis O.

The tip flank face 7 includes first and second tip flank faces 7a and 7b in which a clearance angle gradually increases from the cutting edge 5 toward the side opposite to the drill rotation direction T. Additionally, the tip flank face 7 is inclined to face the rear side toward an outer peripheral side of the drill main body 1, thereby giving a point angle to the cutting edge 5. Moreover, two margin portions 3a connected to the drill rotation direction T side of the chip discharge flute 6 and the side opposite to the rotation direction T are formed on an outer peripheral surface of the cutting edge portion 3, and an outer peripheral flank face (body clearance) 3b is formed between the two margin portions 3a. Moreover, a web thinning portion 6a is formed on an inner peripheral portion of the tip of the chip discharge flute 6.

Additionally, in the drill main body 1, two coolant holes 8 having the same number as the chip discharge flutes 6 are formed from a rear end surface of the shank portion 2 toward the front side. The coolant holes 8 are twisted to the side opposite to the drill rotation direction T toward the rear side of the drill main body 1 with a lead equal to the chip discharge flute 6 and are also formed symmetrically with respect to the axis O similar to the chip discharge flute 6. Each of the coolant holes 8 pass between the two chip discharge flutes 6 in the cutting edge portion 3 and opens to a second tip flank face 7b of the tip flank face 7 on the front end surface of the drill main body 1.

Figure 7:
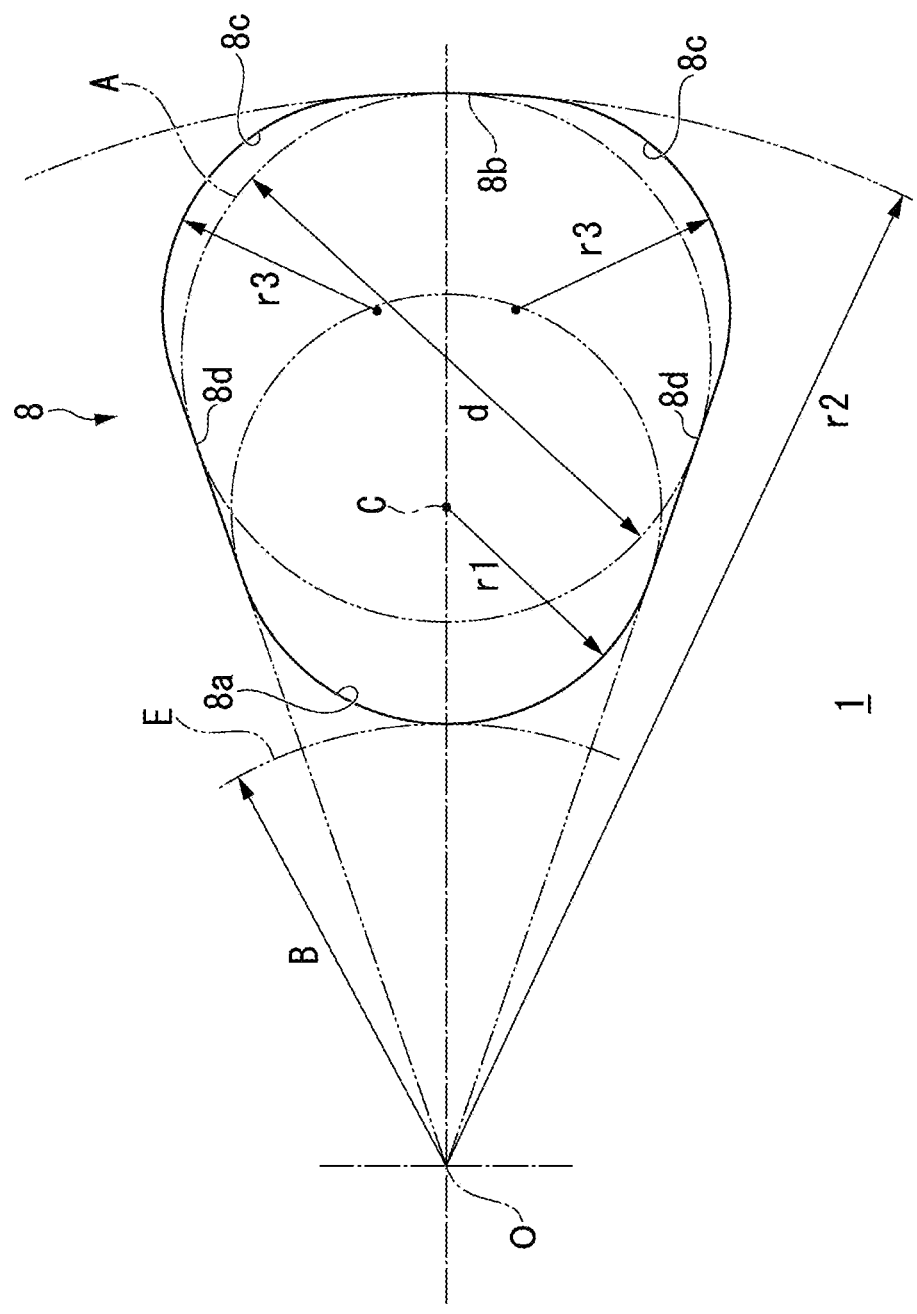
FIG. 7 is an enlarged cross-sectional view of a coolant hole on the right side in FIG. 5.

Also, as shown in FIG. 7, in a cross section orthogonal to the axis O, each of the coolant holes 8 is formed with a concavely curved portion 8a located on an inner peripheral side of the drill main body 1 and formed in a concavely curved shape recessed to the inner peripheral side, a second concavely curved portion 8b located on an outer peripheral side of the drill main body 1 so as to face the first concavely curved portion 8a and formed in a concavely curved shape recessed to the outer peripheral side with a larger curvature radius r2 than a curvature radius r1 of the first concavely curved portion 8a, two third concavely curved portions 8c being in contact with two end portions of the concavely curved portion 8b, extending toward a center side (axis O side) of the drill main body 1 with a smaller curvature radius r3 than the second concavely curved portion 8b, and being recessed in a circumferential direction, and two linear portions 8d connecting an end portion of the first concavely curved portion 8a to end portions of the third concavely curved portion 8c that is not in contact with the second concavely curved portion 8b. The center of the curvature radius r3 of each third concavely curved portion 8c among these portions is inside the coolant hole 8.

Figure 5:
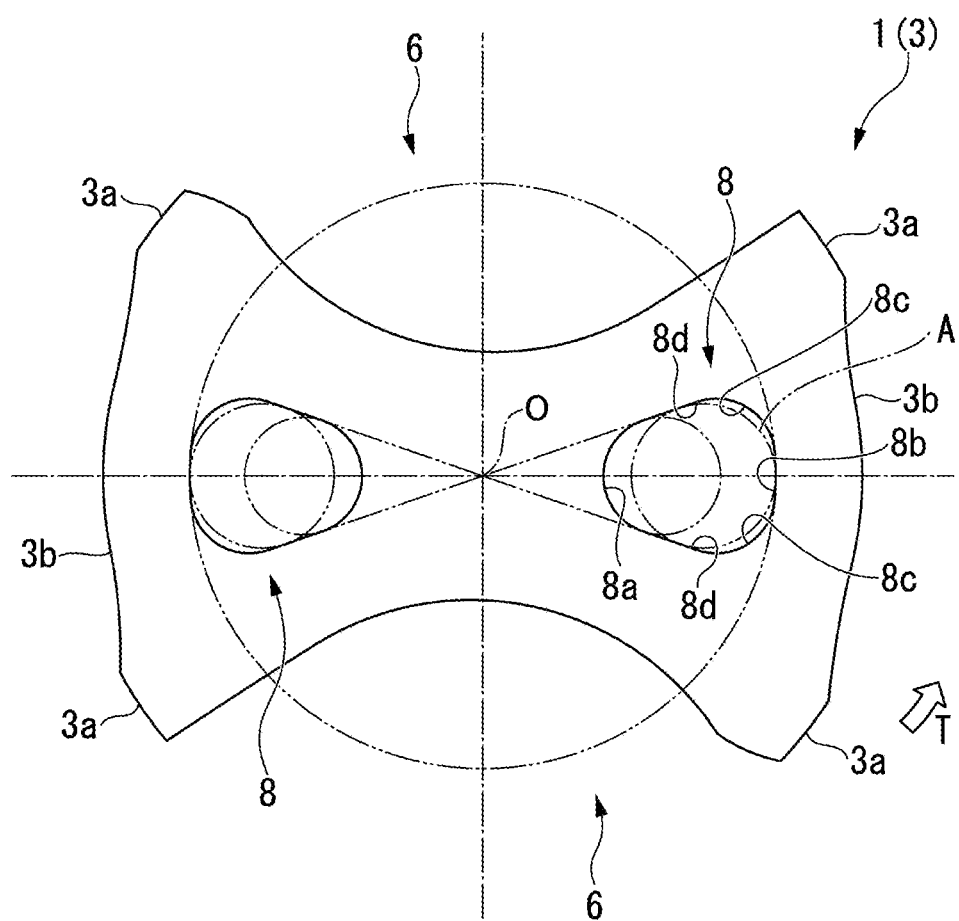
FIG. 5 is a cross-sectional view taken along YY in FIG. 3.
Figure 6:
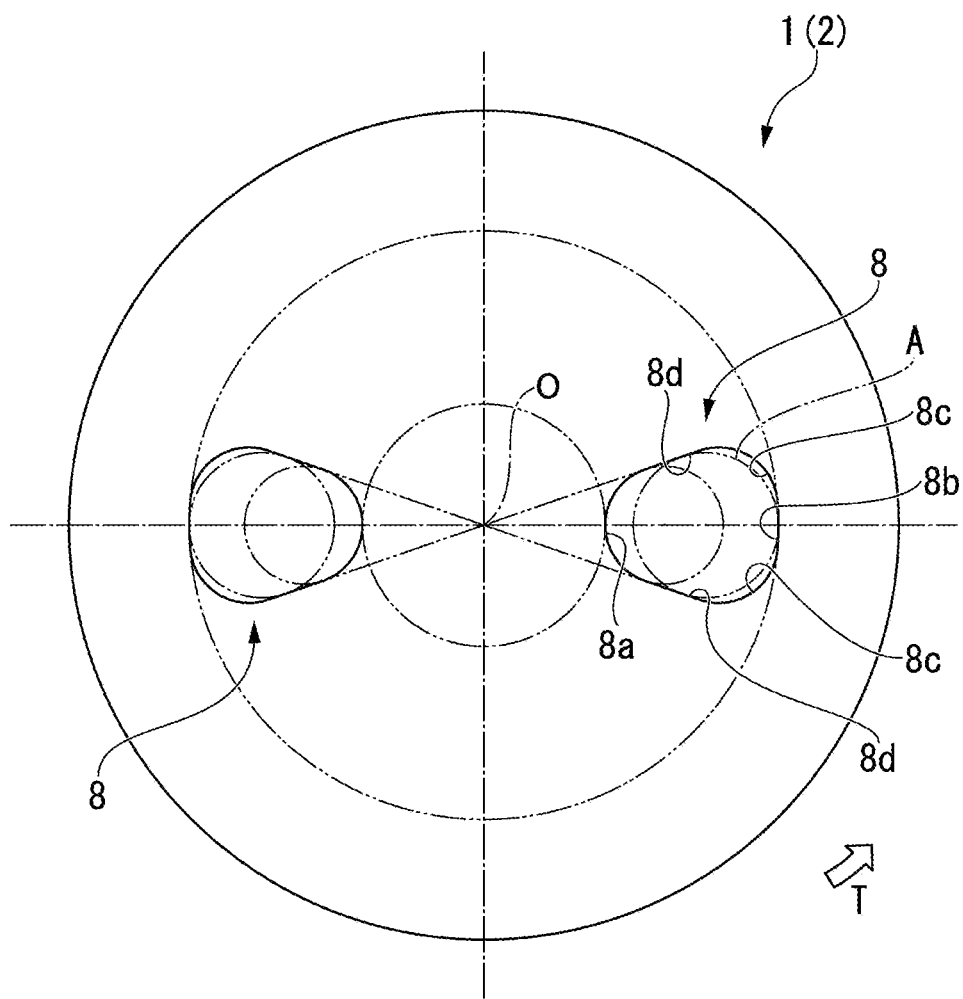
FIG. 6 is a cross-sectional view taken along ZZ in FIG. 3.

In the present embodiment, in the cross section orthogonal to the axis O, the first to third concavely curved portions 8a to 8c of the coolant hole 8 are all formed in a concave arc shape. Additionally, the curvature radii (radii) r3 of the two third concavely curved portions 8c are made equal to each other, and the curvature radius (radius) r1 of the first concavely curved portion 8a is also equal to the curvature radii (radii) r3 of the third concavely curved portions 8c. Moreover, in the present embodiment, the two linear portions 8d are straight lines as shown in FIGS. 5 to 7 in the cross section orthogonal to the axis O, and extend such that extension lines thereof to the inner peripheral side of the drill main body 1 intersect each other on the axis O.

Moreover, the second concavely curved portion 8b has a concave arc shape centered on the axis O of the drill main body 1. Moreover, in the cross section orthogonal to the axis O, the coolant hole 8 has a symmetrical shape via a straight line connecting the axis O of the drill main body 1 and a center C of the first concavely curved portion 8a and is formed such that the width thereof in the circumferential direction gradually increases toward the outer peripheral side of the drill main body 1 from the concavely curved portion 8a to each linear portion 8d and the width thereof in the circumferential direction is gradually reduced toward the outer peripheral side from a tangential point between the linear portion 8d and the third concavely curved portion 8c. In addition, in the present embodiment, the linear portion 8d is in contact with the first concavely curved portion 8a and the third concavely curved portion 8c.

Figure 3:
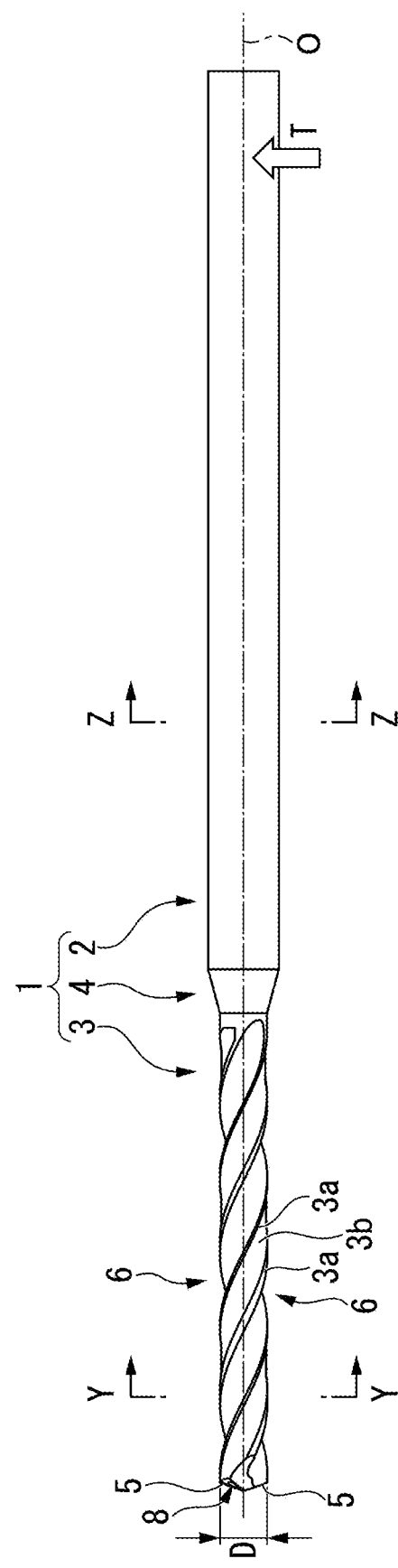
FIG. 3 is a side view as seen in the direction of arrow X in FIG. 2.
Figure 4:
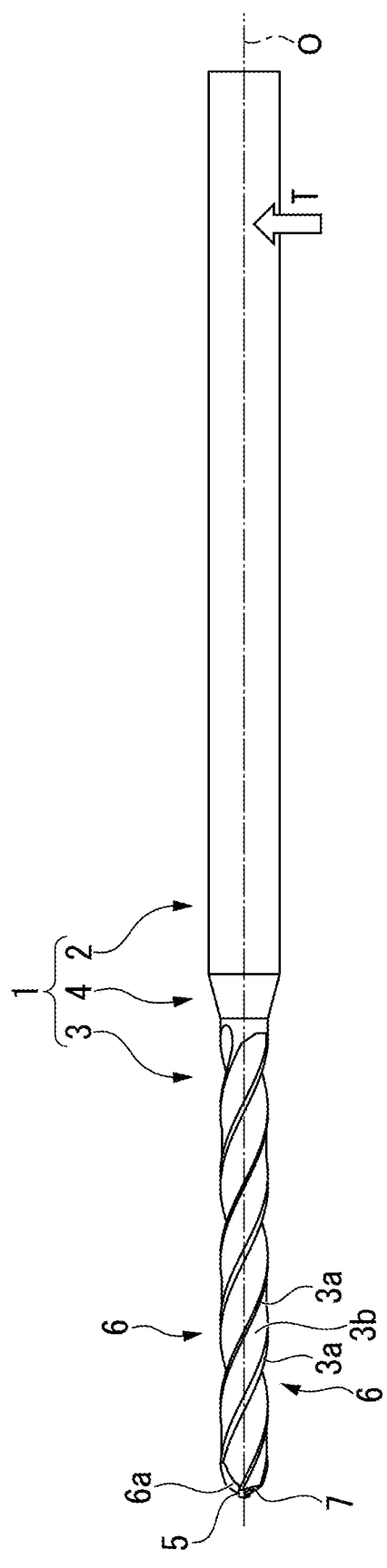
FIG. 4 is a plan view as seen in the direction of arrow Y in FIG. 2.

Additionally, in the cross section orthogonal to the axis O, the first concavely curved portion 8a is in contact with a circle E having a diameter D of the cutting edge 5 shown in FIG. 3 about the axis O, that is, a radius B of 0.05×D or more with respect to the diameter D of a circle formed around the axis O by an outer peripheral end of the cutting edge 5. In addition, it is desirable that the circle E centered on the axis O in contact with the first concavely curved portion 8a has a radius B of 0.15×D or more with respect to the diameter D of the cutting edge 5. Additionally, the curvature radius r2 of the second concavely curved portion 8b is 0.42×D or less with respect to the diameter D of the cutting edge 5.

In such a drill with a coolant hole, coolant such as cutting fluid, mist, or compressed air is supplied from the main spindle of the machine tool to the coolant hole 8 during drilling and is discharged from an opening portion (second tip flank face 7b) of the front end surface of the drill main body 1. The coolant discharged from the coolant hole 8 cools and lubricates the cutting edge 5 and a cutting portion of the workpiece by the cutting edge 5 and also flows through the chip discharge flute 6 toward the rear side of the drill main body 1 to discharge the chips generated by the cutting edge 5.

Also, in the drill with a coolant hole having the above configuration, in the cross section orthogonal to the axis O of the drill main body 1, the coolant hole 8 is formed by the first to third concavely curved portions 8a to 8c recessed to the outside of the coolant hole, and the two linear portions 8d, and a convexly curved portion that is convex to the inside of the coolant hole 8 is not formed. For this reason, as shown in FIG. 7, a diameter d of the circle A inscribed on the coolant hole 8 can be increased in the cross section to secure the cross-sectional area of the coolant hole 8. Moreover, since the first concavely curved portion 8a can be located on the inner peripheral side of the drill main body 1 via the linear portion 8d, the coolant can be sufficiently supplied to the inner peripheral side of the drill main body 1.

Therefore, according to the coolant drill with a coolant hole of the above configuration, the pressure loss of the coolant can be suppressed even in, for example, a drill in which the diameter D of the cutting edge 5 is small. For this reason, the coolant can be discharged from the coolant hole 8 at a sufficient discharge flow rate, and smooth discharge of the chips and effective cooling and lubrication of the cutting edge 5 can be achieved to prevent chip clogging and extend the life of the drill main body 1.

Additionally, as described above, the convexly curved portion that is convex to the inside of the coolant holes 8 in the cross section orthogonal to the axis O is not formed in the coolant bore 8. Therefore, unlike a case where a convexly curved portion is formed at a corner portion of such a convexly curved portion, the curvature radius of the concavely curved portion does not become smaller. That is, the curvature radii r1 and r3 of the first and third concavely curved portions 8a and 8c can be largely secured. For this reason, stress can be prevented from being concentrated on the first and third concavely curved portions 8a and 8c, and a situation in which a crack is generated from the first and third concavely curved portions 8a and 8C at the stage of material molding or the like can be prevented.

Moreover, in the present embodiment, the curvature radius r1 of the first concavely curved portion 8a and the curvature radius r3 of the two third concavely curved portions 8c are equal to each other. For this reason, unlike a case where, in the coolant hole 8 having a constant cross-sectional area, the curvature radius of any one or two concavely curved portions among the curvature radius r1 of the first concavely curved portion 8a and the curvature radius r3 of the two third concavely curved portions 8c are extremely larger than the curvature radius of the other concavely curved portion, it is not necessary to extremely reduce the curvature radius of the other concavely curved portion. Therefore, it is possible to reliably prevent a crack from being generated from the other concavely curved portion.

In addition, it is desirable that a ratio r1/r3 of the curvature radius r1 of the first concavely curved portion 8a to the curvature radius r3 of the two third concavely curved portions 8c is in a range of 0.5 to 2.0 because an extreme size is not caused. Additionally, the curvature radius r3 of the two third concavely curved portions 8c may also be different from each other as long as the ratio is within this range.

Moreover, in the present embodiment, the first concavely curved portion 8a is in contact with the circle E having the radius B of 0.05×D or more with respect to the diameter D of the cutting edge 5 about the axis O in the cross section orthogonal to the axis O. For this reason, there is no concern that damage to the drill main body 1 occurs in a case where the spacing between the coolant hole 8 and the axis O of the drill main body 1 becomes too small and an excessive load acts on the cutting edge portion 3. In addition, in order to reliably prevent damage to such a drill main body 1, as described above, it is more desirable that the first concavely curved portion is in contact with the circle having the radius B of 0.15×D or more with respect to the diameter D of the cutting edge 5 about the axis O in the cross section orthogonal to the axis O.

Additionally, in the present embodiment, the curvature radius r2 of the second concavely curved portion 8b is 0.42×D or less with respect to the diameter D of the cutting edge 5 in the cross section orthogonal to the axis O. For this reason, it is also possible to prevent a situation in which damage to the drill main body 1 occurs because at least one of the two third concavely curved portions 3c in contact with both ends of the second concavely curved portion 8b via the linear portions 8d is too close to the outer peripheral surface of the cutting edge portion 3 of the drill main body 1 and the spacing (wall thickness) between this outer peripheral surface and the coolant hole 8 becomes too small.

In addition, in the present embodiment, as described above, the linear portions 8d are straight lines in the cross section orthogonal to the axis O. However, the linear portions may be linear portions 8e having a substantially linear shape, such as concave curves bulging with respect to the two linear portions 8d, which are straight lines, and having a large curvature radius, for example, as in a modification example of the above embodiment shown in FIG. 8, unless the linear portions are formed in a convex curve shape that is convex to the inside of the coolant hole in the cross section orthogonal to the axis of the drill main body, as in the forward hole wall surface and the backward hole wall surface of the drill with a coolant hole described in Patent Document 1.

Even in the rotating tool (drill) with a coolant hole of such a modification example, the convexly curved portion that is convex to the inside of the coolant hole 8 is not formed in the coolant hole 8 in the cross section orthogonal to the axis O. Therefore, the cross-sectional area of the coolant hole 8 can be secured. Therefore, even in the drill in which the diameter D of the cutting edge 5 is small, the pressure loss of the coolant can be suppressed, and smooth discharge of the chips and effective cooling and lubrication of the cutting edge 5y can be achieved to prevent chip clogging and extend the life of the drill main body 1.

Figure 8:
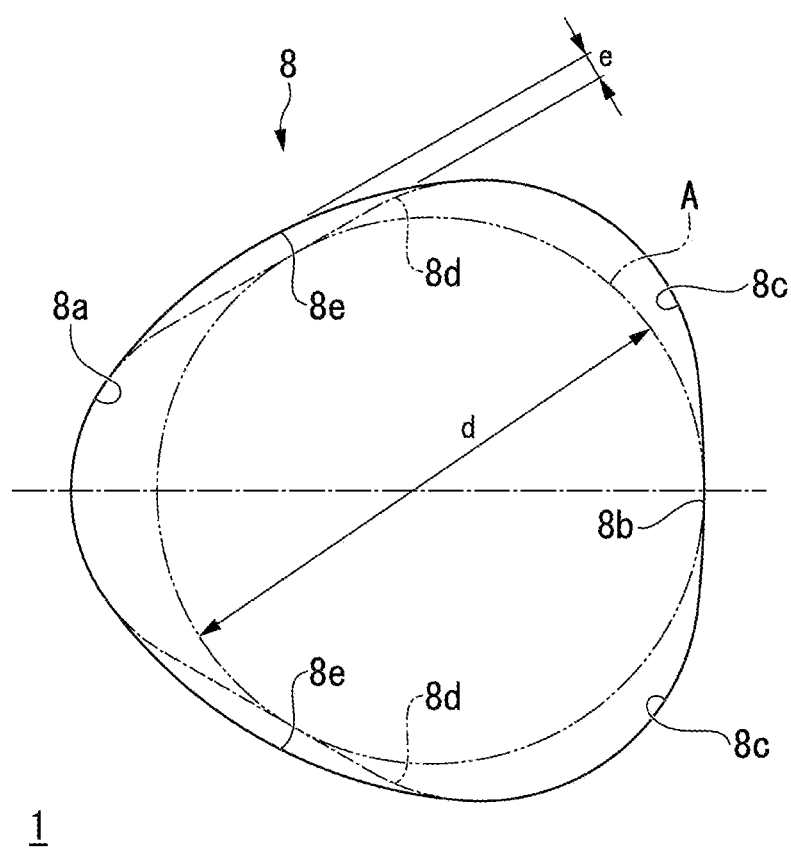
FIG. 8 is a cross-sectional view, corresponding to the enlarged cross-sectional view shown in FIG. 7, showing a modification example of the embodiment shown in FIGS. 1 to 7.

However, when the linear portions 8e that are substantially linear bulge excessively largely with respect to the linear portions 8d that are straight lines, there is a concern that the spacing (wall thickness) between the linear portion 8e and the wall surface of the inner wall face of the chip discharge flute 6 facing the drill rotation direction T or the wall surface of the inner wall face facing the side opposite to the drill rotation direction T becomes smaller and damage occurs in the drill main body 1. For this reason, as shown in FIG. 8, in the cross section orthogonal to the axis O, a maximum protruding amount (bulging amount) e by which the linear portions 8e that are substantially linear bulge with respect to the linear portions 8d that are straight lines is in a range of 5% or less of a diameter d of the circle (the circle in contact with the second concavely curved portion 8b and the two linear portion portions 8d that are straight lines) A inscribed on the coolant hole 8 of the two linear portions 8d that are straight lines.

Additionally, in the present embodiment, a case where the present invention is applied to the drill with a coolant hole has been described. However, the present invention can also be applied to a reamer or an end mill that is the same rotating tool. In particular, in a case where the present invention is applied to the end mill, the coolant hole may open to the inner wall face of the chip discharge flute.

Moreover, in the present embodiment, a case where the present invention is applied to the drill with a coolant hole (a rotating tool with a coolant hole) in which the cutting blades 5, the chip discharge flutes 6, and the coolant holes 8 are two, respectively, has been described. However, it is of course possible to apply the present invention to a rotating tool with a coolant hole in which a cutting edge, a groove, and a coolant hole are one, respectively, and a rotating tool with a coolant hole in which cutting edges, chip discharge flutes, and coolant holes are three or more, respectively. Additionally, the number of coolant holes may be different from the number of cutting edges and the number of chip discharge flutes.

INDUSTRIAL APPLICABILITY

According to the present invention, the generation of a crack from the coolant hole at the stage of material molding or the like can be prevented, a sufficient discharge flow rate of the coolant can be secured, chip clogging can be prevented by improving chip discharge performance, and the life of the tool can be extended by effectively cooling and lubricating the cutting edge.

REFERENCE SIGNS LIST

1: Drill main body (rotating tool main body)
2: Shank portion
3: Cutting edge portion
4: Tapered neck portion
5: Cutting edge
6: Chip discharge flute
7: Tip flank face
8: Coolant hole
8a: First concavely curved portion
8b: Second concavely curved portion
8c: Third concavely curved portion
8d, 8e: Linear portion
O: Axis of drill main body 1
T: Drill rotation direction (tool rotation direction)
r1: Curvature radius of first concavely curved portion 8a
r2: Curvature radius of second concavely curved portion 8b
r3: Curvature radius of third concavely curved portion 8c
A: Circle inscribed on coolant hole 8
d: Diameter of circle A
C: Center of first concavely curved portion 8a
D: Diameter of cutting edge 5
E: Circle in contact with first concavely curved portion 8a centered on axis O in cross section orthogonal to axis O
B: Radius of circle E
e: Maximum protruding amount (bulging amount) of linear portion 8e having concavely curved shape with respect to linear portion 8d that is straight line

What is claimed is:

1. A rotating tool with a coolant hole, comprising:
a rotating tool main body configured to be rotated in a tool rotation direction around an axis,
wherein
a chip discharge flute that opens to a front end surface of the rotating tool main body and extends to a rear side is formed at an outer periphery of a front portion of the rotating tool main body,
a cutting edge, in which a wall surface of an inner wall face of the chip discharge flute facing the tool rotation direction is used as a rake face and the front end surface of the rotating tool main body connected to the rake face is used as a tip flank face, is formed at a front side ridge portion of the wall surface,
a coolant hole that extends toward a front side in an axis direction in the rotating tool main body opens to at least one of the tip flank face and the inner wall face of the chip discharge flute, wherein in a cross section orthogonal to the axis, the coolant hole is provided with a first concavely curved portion located on an inner peripheral side of the rotating tool main body and formed in a concavely curved shape recessed to the inner peripheral side, a second concavely curved portion located on an outer peripheral side of the rotating tool main body so as to face the first concavely curved portion and formed in a concavely curved shape recessed to the outer peripheral side with a larger curvature radius than a curvature radius of the first concavely curved portion, two third concavely curved portions being in contact with two end portions of the second concavely curved portion, respectively, having a center of a curvature radius located inside the coolant hole with a smaller curvature radius than that of the second concavely curved portion, extending to a center side of the rotating tool main body, and being recessed in a circumferential direction, and two portions connecting an end portion of the first concavely curved portion to the end portion of the third concavely curved portion that is not in contact with the second concavely curved portion, wherein in the cross section orthogonal to the axis, the coolant hole as a symmetrical shape via a straight line, the straight line being orthogonal to the axis of the rotating tool main body and passing through a center of the first concavely curved portion, the coolant hole is formed such that a width thereof in the circumferential direction gradually increases toward the outer peripheral side of the rotating tool main body in the first concavely curved portion and the two portions, and the coolant hole is formed such that the width thereof in the circumferential direction is gradually reduced toward the outer peripheral side of the rotating tool main body in the third concavely curved portion, wherein either the two portions form straight lines in the cross section orthogonal to the axis, or the two portions form concave curves recessed to an outside of the coolant hole in the cross section orthogonal to the axis, in the cross section orthogonal to the axis, a distance along a direction orthogonal to a direction where the straight line extends of distances between the two portions, is set such that an increasing rate is gradually decreased by each unit length toward the outer peripheral side of the rotating tool main body in the direction where the straight line extends.

2. The rotating tool with a coolant hole according to claim 1, wherein a ratio r1/r3 of a curvature radius r1 of the first concavely curved portion to a curvature radius r3 of the two third concavely curved portions is in a range of 0.5 to 2.0.

3. The rotating tool with a coolant hole according to claim 1, wherein the first concavely curved portion is in contact with a circle having a radius of 0.05×D or more with respect to a diameter D of the cutting edge about the axis in the cross section orthogonal to the axis.

4. The rotating tool with a coolant hole according to claim 1, wherein a curvature radius of the second concavely curved portion is 0.42×D or less with respect to a diameter D of the cutting edge in the cross section orthogonal to the axis.

5. The rotating tool with a coolant hole according to claim 1, wherein the two portions form straight lines in the cross section orthogonal to the axis.

6. The rotating tool with a coolant hole according to claim 1, wherein the two portions form concave curves recessed to the outside of the coolant hole in the cross section orthogonal to the axis.

7. The rotating tool with a coolant hole according to claim 6, imaginary straight lines connect each of the end portions of the first concavely curved portion and the end portion of each of the third concavely curved portions not in contact with the second concavely curved portion, a circle is inscribed on the second concavely curved portion and the imaginary lines, in the cross section orthogonal to the axis, a maximum amount by which the concave curves bulge with respect to the imaginary lines is in a range of 5% or less of a diameter of the circle.

* * * * *